(12) United States Patent
Cavaliere et al.

(10) Patent No.: US 10,085,077 B2
(45) Date of Patent: Sep. 25, 2018

(54) OPTICAL SWITCH FOR RADIO ACCESS NETWORK

(71) Applicant: Telefonaktiebolaget LM Ericsson (publ), Stockholm (SE)

(72) Inventors: Fabio Cavaliere, Pisa (IT); Kim Laraqui, Stockholm (SE); Roberto Sabella, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/307,064

(22) PCT Filed: Apr. 28, 2014

(86) PCT No.: PCT/EP2014/058614
§ 371 (c)(1),
(2) Date: Oct. 27, 2016

(87) PCT Pub. No.: WO2015/165488
PCT Pub. Date: Nov. 5, 2015

(65) Prior Publication Data
US 2017/0055050 A1 Feb. 23, 2017

(51) Int. Cl.
*H04Q 11/00* (2006.01)
*H04J 14/02* (2006.01)

(52) U.S. Cl.
CPC ...... *H04Q 11/0005* (2013.01); *H04J 14/0209* (2013.01); *H04J 14/0282* (2013.01);
(Continued)

(58) Field of Classification Search
CPC ..... H04B 10/2575–10/25759; H04Q 11/0005; H04Q 2011/0016; H04Q 2011/0032; H04J 14/0209; H04J 14/0282
See application file for complete search history.

(56) References Cited

U.S. PATENT DOCUMENTS 7,426,210 B1 * 9/2008 Miles ................. H04J 14/0223
370/400
8,792,787 B1 * 7/2014 Zhao ................. H04B 10/2575
398/48

(Continued)

FOREIGN PATENT DOCUMENTS

WO 2013007318 A1 1/2013
WO 2013119153 A2 8/2013
WO 2013149660 A1 10/2013

OTHER PUBLICATIONS

PCT International Search Report, dated Jan. 16, 2015, in connection with International Application No. PCT/EP2014/058614, all pages.

(Continued)

*Primary Examiner* — Casey Kretzer
(74) *Attorney, Agent, or Firm* — Sage Patent Group

(57) ABSTRACT

A switch configured to connect a plurality of remote radio units with a plurality of main units in a radio access network. The switch comprises a first stage comprising one or more first units configured to receive a signal originating from a remote radio unit, and configured to output one or more spectral component having a wavelength. The switch further comprises a central stage configured to receive the one or more optical wavelength, and transfer the spectral component to an output port determined by the wavelength. The switch further comprises a second stage comprising one or more second units configured to receive the one or more spectral component from the central stage and output a signal towards a main unit. The first unit is configured to control the wavelength of the output spectral component such that the spectral component is transferred by the central stage to a selected one of said second units.

14 Claims, 5 Drawing Sheets

(52) U.S. Cl.
CPC ............ *H04Q 2011/0016* (2013.01); *H04Q 2011/0032* (2013.01)

(56) References Cited

U.S. PATENT DOCUMENTS

| | | | |
|---|---|---|---|
| 2002/0141409 A1* | 10/2002 | Chang ................. | H04L 12/1836 370/390 |
| 2009/0324243 A1 | 12/2009 | Neilson | |
| 2013/0077977 A1* | 3/2013 | Guillory .......... | H04B 10/25754 398/115 |
| 2015/0215044 A1* | 7/2015 | Cvijetic ............. | H04Q 11/0062 398/48 |

OTHER PUBLICATIONS

Nicola Carapallese et al., Placement of Base-Band Units (BBUs) over Fixed/Mobile Converged Multi-Stage WDM-PONs, 17 International Conference on Optical Networking Design and Modeling Apr. 16-19, 2013, Brest, France, pp. 246-251.

International Preliminary Report on Patentability, dated Nov. 1, 2016, in connection with International Application No. PCT/EP2014/058614, all pages.

* cited by examiner

OPTICAL SWITCH FOR RADIO ACCESS NETWORK

TECHNICAL FIELD

Embodiments herein relate to a switch and a method of operating a switch, which connects a plurality of remote radio units and main units in a radio access network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises Radio Base Stations (RBS) providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

A system separates a radio base station into main units (MU), also referred to as base band units or digital units, and remote radio units (RRUs). In this radio base station implementation a radio frequency and baseband processing equipment of the Radio base station are split in two different locations. The MU and RRU are connected via e.g. an optical network. The MUs may be centralized and located for example 10s of km from the remote radio units. The remote radio units are placed close to the radio antennas, e.g. in antenna masts. This minimizes feeder and jumper losses between antenna and remote radio units, which is often a major challenge to address in most radio communications networks, for example, to enhance the uplink capacity of mobile services. The signal processing is centralized in a MU, which offers processing resources for multiple cells, each covered by an antenna driven by a RRU. This allows a pool of processing resources to be dynamically shared among many cells, in line with the cloud computing principle, saving energy, This system configured for remote radio units and main units is gaining significant interest and has some clear advantages, e.g. when it comes to installation of the remote radio units close to the antennas.

In some examples, the interface between the main units and remote radio units is an optical Non-Return to Zero (NRZ) signal, which is a sampled In-phase Quadrature (I/Q) air interface waveform. Sampling the air waveform makes the remote radio unit implementation relatively simple but leads to very high bitrates of the optical signal, in the order of 1.25 Gbps per antenna.

A Common Public Radio Interface (CPRI) specifies a Time Division Multiplexing (TDM) like protocol for Radio Base Station (RBS) configurations in a system configured for remote radio units and main units over a first layer. The application of CPRI between the main units and the remote radio units is static, i.e. determined as the RBS is deployed, and its configuration is only changed as part of a predetermined topology involving the main units and the remote radio units.

The CPRI defines a protocol which is used to connect a Radio Entity Control unit (REC), a Radio Entity (RE). In a typical configuration, the REC will be used in a Main Unit to control RE(s) in remote radio units. The main unit and remote radio units split in this main-remote approach may be applicable to a macro cabinet, main-remote, integrated antenna or indoor small cells.

CPRI requires accurate synchronization and latency control. Even if conventional CPRI transport is normally operated on fiber using point-to-point optical connections between MU and RRU distant less than a few hundreds of meters, there is a demand to extend its reach over geographical distances.

A typical location of remote radio units has a plurality of remote radio units and antennas. To reduce the required number of fibers connected to the location of remote radio units, the remote radio units are in some examples daisy-chained, i.e. wired together in a sequence or in a ring, to generate a multiplexed digital signal of up to 10 Gbps. 10 Gpbs may be the highest rate supported by the protocol generally used between a remote radio unit and a main unit, i.e. the CPRI. This does not provide for a desired flexibility in a connection between a remote radio unit and a main unit.

Traditional dedicated point to point links established between a limited number of MU ports and associated RRUs is inadequate to meet these new extended distance requirement. For example, the need of new installed fibers would be not sustainable as soon as the distances between RRU and associated main unit became longer than a few kilometers.

SUMMARY

In a first aspect of the invention, there is provided a switch configured to connect a plurality of remote radio units with a plurality of main units in a radio access network. The switch comprises a first stage comprising one or more first units configured to receive a signal originating from a remote radio unit, and configured to output one or more spectral component having a wavelength. The switch further comprises a central stage configured to receive the one or more optical wavelength, and transfer the spectral component to an output port determined by the wavelength. The switch further comprises a second stage comprising one or more second units configured to receive the one or more spectral component from the central stage and output a signal towards a main unit. The first unit is configured to control the wavelength of the output spectral component such that the spectral component is transferred by the central stage to a selected one of said second units.

Thus, a switched connection is provided between a remote radio unit and a main unit.

In a second aspect of the invention, there is provided a switch system comprising the switch as described in any example. The switch system further comprises a control unit configured to control the switch to connect a determined remote radio unit with a determined main unit.

In a third aspect of the invention, there is provided a method of operating a switch connecting a plurality of remote radio units with a plurality of main units in a radio access network. The method comprises receiving at a first stage a signal originating from a remote radio unit, and outputting one or more spectral component having a wavelength. The method further comprises receiving at a central stage the one or more optical wavelength, and transferring the spectral component to an output port determined by the wavelength. The method further comprises receiving at a second stage the one or more spectral component and outputting a signal towards a main unit. The wavelength of the spectral component output from the first stage is controlled such that the spectral component is transferred by the central stage to a selected one of said units.

In a fourth aspect of the invention, there is provided a method of operating a control unit configured to control a switch connecting a plurality of remote radio units with a plurality of main units in a radio access network. The method comprises determining a connection request between a remote radio unit and a main unit, and determining a wavelength for a first or second unit to output a signal received from the remote radio unit or main unit. The wavelength determines an output port of a central stage between the first and second units. The method further comprises setting the determined wavelength at the first or second unit to establish a connection between the remote radio unit and the main unit.

In a fifth aspect of the invention, there is provided a computer program product configured to implement the method of any example of the invention.

BRIEF DESCRIPTION OF THE DRAWINGS

Embodiments will now be described by way of example only in relation to the enclosed drawings, in which.

DETAILED DESCRIPTION

Figure 1:
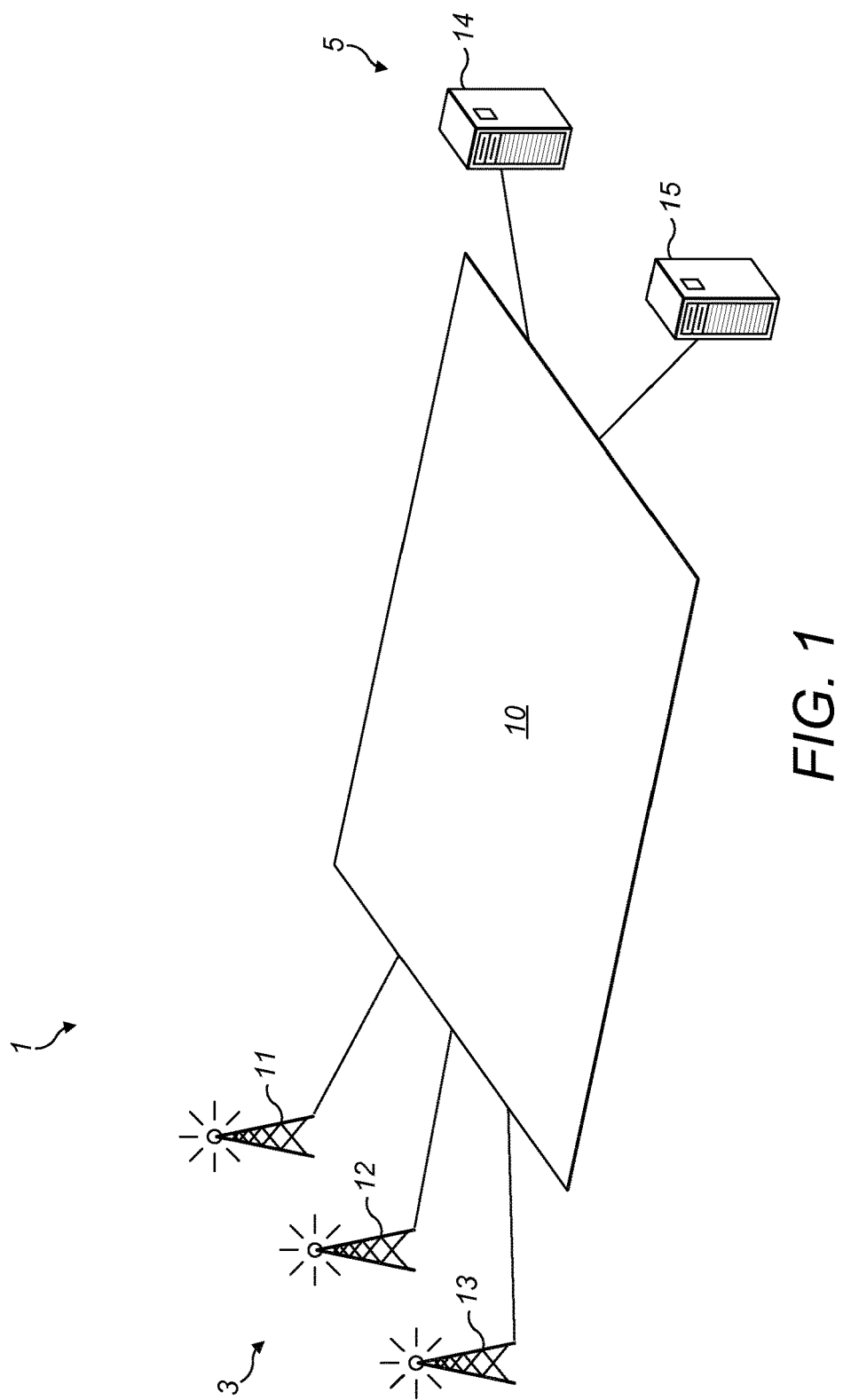
FIG. 1 is a schematic overview depicting a system according to an example of the invention.

FIG. 1 is a schematic overview of an access system having radio remote units 3 and main units 5. The system is compliant with a number of radio access technologies such as LTE, LTE-Advanced, WCDMA, GSM/EDGE, WiMax, or UMB, just to mention a few possible implementations. The system comprises radio base stations that are separated into remote radio units (RRUs), as acting in the role of Radio Equipments (RE), exemplified as RRUs 3 and main units (MU) 5 acting as a Radio Equipment Control units (REC), exemplified as main units 5. The main units 5 may also referred to as digital units (DUs) or base band units. The RRUs 3 are shown having example RRUs 11,12,13. The MUs 5 are shown having example MUs 14,15.

The RRUs 3 are connected with the MUs 5 via a switch 10. The switch 10 is configured to connect a selected RRU 3 with a selected main unit 5. In some examples, the switch 10 allows a connection to be selected between any one of the MUs and any one of the RRUs. The RRUs 3 and MUs 5 are in general not co-located, but are sited in different locations. In some examples, at least some of the RRUs 3 are clustered together and/or at least some of the MUs 5 are clustered together.

In some examples, the selection of a connection between RRU and MU is based on topology data and/or configuration data such as one or more of links, ports, technology, antenna characteristics, radio standard supported by the RRU, frequency bands used, bandwidth, vendor, release version, geographical position and/or operator. In some examples, a physical path between a RRU and MU is determined by the switch 10.

In some aspects, the switch 10 is a distributed switch. For example, the whole optical network is a part of, or within, the switch 10. The switch 10 is a single switch for the access network between RRUs and MUs in an area. In some examples, the connection path between a RRU 3 and the switch is independent of which MU the connection is with. The connection path between a MU 5 and the switch 10 is independent of which RRU the connection is with. In some aspects, the physical path for data between RRUs and MUs depends only on the selection of the connection between a particular RRU and MU. Alternatively, a different path between remote parts of the switch 10 may be selected by the switch 10.

The distributed switch 10 is not based at a single location. The switch may be considered as having one or more stages adjacent to the RRUs and/or one or more stages adjacent to the MUs. Such adjacent stages may or may not be co-located with the RRUs or MUs. Optionally, the switch 10 comprises one or more additional stages at further locations.

Figure 2:
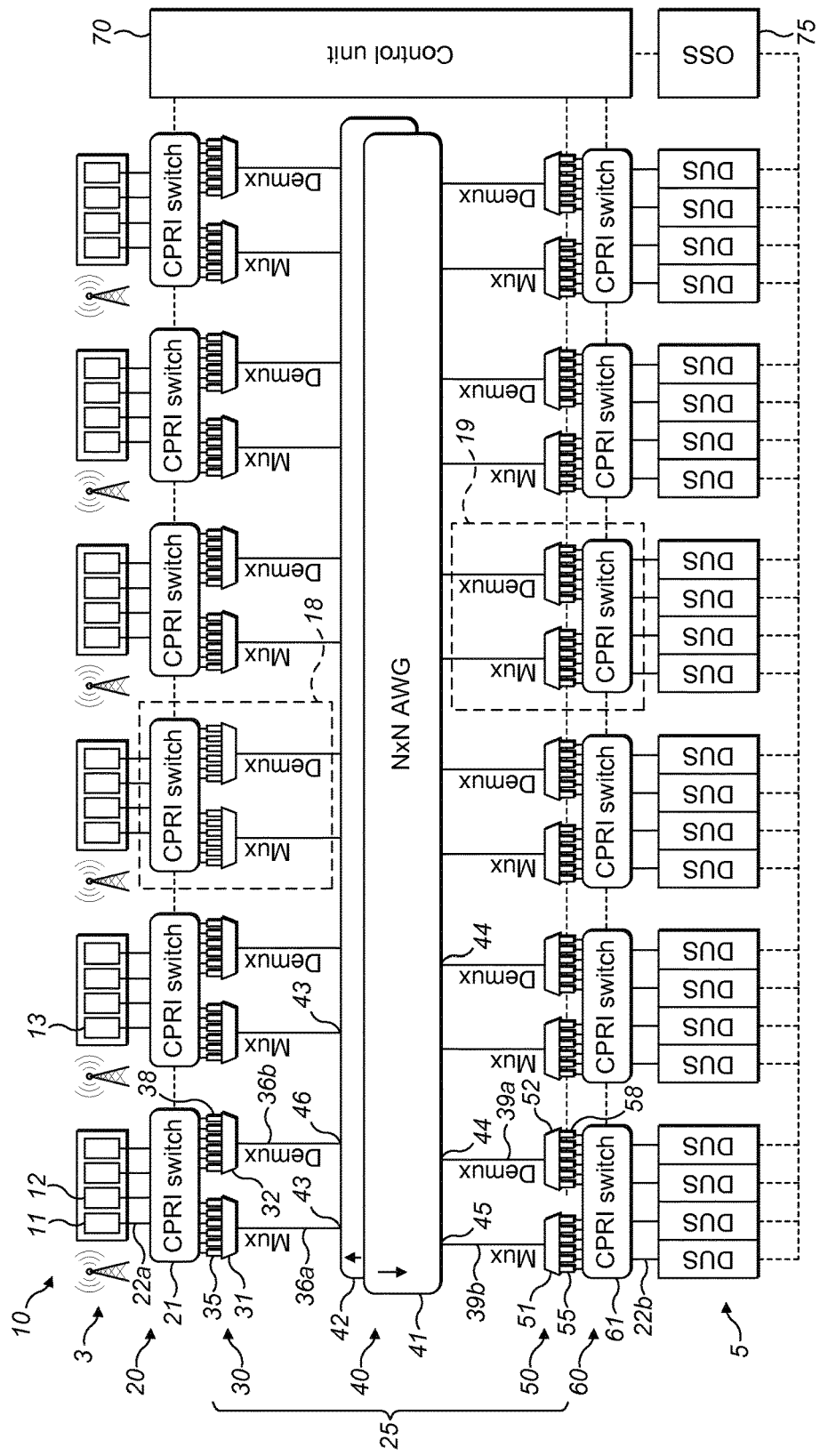
FIG. 2 is a schematic overview depicting a switch according to an example of the invention.

FIG. 2 shows an example architecture of a switch 10. The switch 10 comprises a plurality of layers of switch connecting RRUs 3 with MUs 5. In some examples, a layer comprises one or a plurality of stages. In some aspects, the switch 10 comprises three layers 20,25,60. A first outer layer 20 and a second outer layer 60 comprises one or more switches implemented in first and second units 18,19 respectively. The first and second units 18,19 are each connected to one or more RRU 3 or MU 5 respectively. In some examples, the first and second units 18,19 are each connected to a plurality of RRUs 3 or MUs 5 respectively. In the example shown, the switch 10 comprises a plurality of first and second units 18,19, each having the same structure.

The first and second units 18,19 are configured to do time switching or packet switching of signals between a RRU and MU. For example, first and second units 18,19 comprises one or more CPRI switches 21,61. The switches 21,61 are configured to aggregate or separate signals for different RRUs or MUs to which they are attached, using time or packet division multiplexing/demultiplexing. For example, if there are low data loads to or from a particular RRU or MU, the signals (CPRI data) may be aggregated or separated by the switches 21,61.

In some aspects, individual RRUs in a RRU cluster need to be connected to the appropriate MU. In case the RRU produces/consumes a high rate of CPRI data flow, e.g. resulting in a flow of nearly 10 Gbps. In this case, that flow does not need to be aggregated at the CPRI level before entering the optical domain. In this case, the CPRI switch 21 does not perform an aggregation of the data flow from that RRU with a data flow from another RRU. As such, the aggregation by the first or second outer layer 20, 60 is optional, even if the switch 10 has the functionality to perform aggregation.

Alternatively, if a group of RRUs 3 in the cluster produce low rate CPRI data flows, e.g. around 1 Gbps, then these flows can be aggregated on the CPRI switch 21. The aggregation by switch 21 is before mapping the flow to the optical domain (i.e. optical inner layer 25).

In some aspects the CPRI switches 21, 61 are optional, and may not be part of the switch 10. As such, the switch 10 does not time or packet multiplex/demultiplex signals to the connected one or more MUs or RRUs.

The switch further comprises an inner layer 25, connected between the first and second outer layers 20,60. The inner layer 25 is an optical layer configured to carry out an optical switching of the signals between the first and second outer layers 20,60. For example, the optical switching is at a wavelength level, i.e. lambda switching. In some aspects, the inner layer 25 connects the appropriate switch 21 of the first outer layer 20 with the required switch 61 of the second outer layer 60.

In some aspects, the switch 10 may be considered as comprising five stages. A first, outer, stage 20 may be considered as equivalent to the first outer layer 20. The second outer stage 60 may be considered as equivalent to second outer layer 60. The first outer stage 20 and second outer stage 60 comprises one or more switches 21,61.

The inner layer 25 may be considered as comprising three stages. As such, the inner layer 25 comprises a first inner stage 30 and a second inner stage 50. A third stage, referred to as a central stage 40, is connected between the first inner stage 30 and second inner stage 50.

The first inner stage 30 and second inner stage 50 each comprise one or more multiplexers 31,51 and one or more demultiplexers 32,52. The multiplexers 31,51 and demultiplexers 32,52 are configured to respectively optically multiplex and demultiplex optical signals to or from the adjacent first or second outer stage 20,60. For example, the multiplexers 31,51 and demultiplexers 32,52 are configured to carry out wavelength division multiplexing/demultiplexing. As such, the first inner stage 30 and second inner stage 50 have as inputs from the central stage 40, and outputs to the central stage 40, wavelength division multiplexed (WDM) optical signals.

The first units 18 may be considered as implementing both the first outer stage 20 and the first inner stage 30. Similarly, the second units 19 may be considered as implementing both the second outer stage 60 and the second inner stage 50. The first outer stage 20 and the first inner stage 30 may be considered as co-located in one of the first units 18, and the second outer stage 60 and the second inner stage 50 may be considered as co-located in one of the second units 19. For example, a plurality of functions are implemented in a same card. Alternatively, the multiplexer/demultiplexer 31,32; 51,52 are hosted in a separate card in the same subrack, along with a card comprising the time/packet domain switch 21,61 and a card hosting transceivers (e.g. tunable lasers and photodiodes).

The central stage 40 is arranged to optically switch signals to the required output. In particular, the central stage 40 is configured to switch a spectral component of the optical signal according to its wavelength. In some examples, the central stage is a passive optical switch. In some examples, the central optical stage 40 is an Arrayed Waveguide Grating (AWG).

One or more of the stages described and/or MUs 5 is controlled by a control unit 70. In some examples, the control unit receives input from an Operation Support System (OSS).

The switch 10 will now be described in more detail, with reference to an example of a signal originating from an RRU 11,12,13.

The signal is transmitted from the RRUs 11,12,13 to the connected one of the plurality of the first units 18, e.g. to one of the of the CPRI switches 21. The connection to the first units 18 is an electrical connection 22a, or alternatively, an optical connection. One or more RRUs are connected to a common switch 21, and in this example, a plurality of RRUs are connected to a common switch. For example, RRUs 11,12 share a CPRI switch 21, and RRU 13 is connected to a different one of the CPRI switches 21.

The CPRI switches 21 are configured to aggregate the signals from different ones of the connected RRUs. The RRUs are optionally switched in the time domain to aggregate the signal from one or more RRUs onto a same wavelength.

The CPRI switches 21 are configured to handle signals for a small number of RRUs, for example, four RRUs. The small size of the switch 21 reduces latency and power consumption issues that could occur by increasing the number of attached client RRUs 3.

The output of the CPRI switches 21 are connected to the first inner stage 30. The first inner stage 30 is configured to control the wavelength of an optical output carrying the signal from the RRU. For example, the first optical inner stage 30 comprises one or more optical transmitter having a tunable frequency, e.g. tunable lasers 35. The tunable lasers 35 are each connected to an output of the CPRI switch 21, or are an integral part of the output of the CPRI switch 21.

The wavelength of the optical output (e.g. laser wavelength) is selected in order to switch the optical signal towards the intended main unit. The wavelength of the optical output is selected under control of the control unit 70. The wavelength output by the tunable laser is used to set up a connection between one of the switches 61 at the MU side and one of the switches 21 at the RRU side. The RRU and MU are then selected by the switches 21,61.

For a number N of available optical wavelengths, the output of the CPRI switches 21,61 are connected to minimum of 1, and a maximum of N tunable lasers.

In some examples, the wavelengths of the optical output are multiplexed together by a multiplexer 31. The multiplexer 31 is configured to multiplex all of the wavelengths associated with one CPRI switch 21, e.g. in relation to one cluster of one or more RRUs. For example, the multiplexer 31 is a wavelength division multiplexer, and in some examples, is configured to carry out Dense Wavelength Division Multiplexing (DWDM).

The optical signals generated by the first optical inner stage 30 are transmitted to the central stage 40. In this example, the AWG has N input ports and N output ports, i.e. an N×N AWG.

The multiplexed signals coming from all the clusters are sent to the central stage 40 on optical connections 36a (e.g. optical fiber), which functions as a central wavelength router. The signal is received from the RRUs at an input port 43 of the AWG 40. The AWG is shared by all the clusters (i.e. all the RRUs and MU) and acts as central switching stage. N is the available number of wavelengths that can be connected. N also indicates the maximum number of MU or RRU clusters that can be connected.

The AWG is configured such that an input wavelength at one of the input ports may be tuned to select one of the output ports. The structure of the AWG will output a signal to an output port 44 determined by the wavelength of the signal. The output port 44 determines which MU or second unit 19 (cluster of MUs) the signal is switched to. Thus, the selected wavelength of the signal received by the central stage (AWG), and the input port, determines the connections (i.e. operation) of the switch.

For a spectral component comprising time or packet division multiplexed signals for a plurality of MUs, the wavelength of the spectral component determines the destination second unit 19. The second unit 19 is configured to time or packet demultiplex the optical signal, and output to the intended MU. For a spectral component comprising a signal for a single MU (i.e. not time or packet multiplexed), the spectral component may determine both the intended second unit 19 and the intended MU.

Aspects of the invention may be considered as relating to a switch 10, configured to connect a plurality of remote radio units with a plurality of main units in a radio access network. The switch 10 comprising the first (inner) stage 30 is configured to receive a signal originating from a remote radio unit, and output one or more spectral component having a selected wavelength. The second (inner) stage 50 is configured to receive the one or more spectral component and output a signal towards a main unit 5. A passive optical central stage 40 outputs the signal towards a main unit determined by the wavelength selected by the first (inner) stage 30, under the control of the control unit 70.

In some aspects, the central stage (and inner layer 25) is all optical, i.e. does not require conversion to an electrical signal. In particular, the AWG is a N×N AWG, having N ports connected to N first units 18 and N ports connected to N second units 19. Alternatively, the number of ports providing connections to the first units 18 is different to the number connected to the second units 19.

Table 1 shows the AWG transfer function. This indicates the cyclic operation of the N×N AWG.

TABLE 1

|  | Out port #1 | Out port #2 | Out port #3 | ... | Out port #N − 1 | Out port #N |
|---|---|---|---|---|---|---|
| In port #1 | $\lambda_1$ | $\lambda_2$ | $\lambda_3$ | ... $\lambda_{N-1}$ | $\lambda_N$ |
| In port #2 | $\lambda_2$ | $\lambda_3$ | $\lambda_4$ | ... $\lambda_M$ | $\lambda_1$ |
| In port #3 | $\lambda_3$ | $\lambda_4$ | $\lambda_5$ | ... $\lambda_1$ | $\lambda_2$ |
| ... | ... | ... | ... | ... ... | ... |
| In port #N − 1 | $\lambda_{N-1}$ | $\lambda_N$ | $\lambda_1$ | ... $\lambda_{N-3}$ | $\lambda_{N-2}$ |
| In port #N | $\lambda_N$ | $\lambda_1$ | $\lambda_2$ | ... $\lambda_{N-2}$ | $\lambda_{N-1}$ |

As described in the above table, and in accordance with the known function of an AWG, the input port and wavelength determine the output port.

The central stage 40 comprises a first AWG 41 and a second AWG 42. The structure of the AWG is unidirectional, such that first and second AWGs 41,42 are present in the central stage 40 to provide for transmission in both directions between the RRUs and MUs. In this example, the first AWG 41 is for signals from the RRUs to the MUs, and the second AWG 42 from the MUs to the RRUs.

Each one of the central stage 40 (AWG) outputs 44 is sent to a second unit 19 on an optical connection 39a. The structure of the switch 10 is the same on the RRU and MU sides of the central stage 40.

The output port 44 of the central stage 40 is connected to the demultiplexer 52 of the second inner stage 50. The demultiplexer 52 is configured to demultiplex the optical signal, e.g. demultiplex the WDM signal. The demultiplexed output of the demultiplexer 52 is a plurality of optical signals on different ports. The demultiplexed optical signals are separately output to one or more optical detectors or photoreceiver 58, e.g. photodiodes. The optical transmitters and receivers may comprise other necessary components, e.g. electrical amplifiers, drivers, clock recovery.

The optical detectors 58 outputs an electrical signal to the second outer stage/layer 60, e.g. a CPRI switch 61. The signal output to the second outer stage 60 comprises a signal for one or more MUs. The CPRI switch 61 demultiplexes any time division multiplexing applied by the CPRI switch 21. The second outer stage/layer 60 outputs the demultiplexed signal to each of the MUs. The output to the MUs is on a connection 22b, which may be an electrical or optical connection. In some examples, the switches 21, 61 may alternatively or also switch antenna carrier (AxC) streams and/or CPRI sub-flows.

The switch 10 also provides for an equivalent transmission from a MU to a selected first unit 18 for a RRU, and optionally directly to a selected RRU. A similar operation, requiring the second AWG 42, is performed in the reverse direction for CPRI signals transmitted from the MUs 5 to the RRUs 3. In some examples, the reverse direction may utilize different optical connections 39b,36b e.g. fibres, between the second unit 19 and central stage 40, and between the central stage 40 and the selected first unit 18. Alternatively, the same optical connections are used in two directions.

From a MU 5, a signal for transmission by a RRU 3 is transmitted to an adjacent second outer stage 60, e.g. to a CPRI switch. Similar to the first outer stage 20 described above, signals from a plurality of MUs are optionally time or packet multiplexed by the second outer stage 60.

The output from the second outer stage 60 is transmitted to the second inner stage 50. The second inner stage 50 is configured to control the wavelength of an optical output carrying the signal towards the RRU. For example, the second optical inner stage 30 comprises one or more tunable lasers 55.

The selected wavelengths are further multiplexed in the second inner stage 50, e.g. by a wavelength division multiplexor 51, equivalent to the multiplexing by the multiplexor 31. The selected wavelengths are received at the input ports 45 of the central stage 40. In some examples, the input port 45 is to the second AWG 42 of the central stage.

As described above, the central stage optically switches the signal according to the received wavelength at the input port 45. The signal is switched to a corresponding output port 46. The signal output from the output port 46 may comprise one or wavelengths, for one or more RRUs. The signal is optically demultiplexed (if necessary) by a demultiplexer 32 in the first inner stage 30. The first inner stage also comprises an optical detector 38, e.g. photodiode, for detecting the demultiplexed optical signals. The demultiplexed signals are passed to the first outer stage 20, e.g. to CPRI switch 21 for optional time or packet demultiplexing. The signals are then switched by the CPRI switch to the appropriate RRU for transmission.

In some examples, one of the first or second unit serves a plurality of MU or RRU, e.g. serves between four and eight MU or RRU. In one example, the cyclic AWG has 48 wavelengths or ports.

In some examples, there are further possible implementations for the WDM section within the cluster. For example, the switch 10 comprises tunable small form factor pluggable plus (SFP+) optical module connected to an external AWG. Alternatively, the switch 10 comprises multi-wavelength tunable photonic integrated circuits (PICs), for example, with an embedded AWG and external coupler or sub-band multiplexer.

For example, AWGs are embedded in the PICs, configured to multiplex a subset of WDM channels (e.g. 10) and multiplex the resulting WDM sub-bands by band-mux filters. The switch according to an example of the invention comprises a first and second outer layer (e.g. CPRI switches) at the RRU cluster and MU cluster respectively. The output signals of the time domain CPRI switches are converted to a selected frequency (e.g. by a tunable laser) and multiplexed, e.g. WDM. In some examples, these functions are also at the RRU cluster and MU cluster. The central stage configured for optical wavelength switching (e.g. by an AWG), may be at any location connected to, and including, the RRU and MU clusters.

The control unit 70 controls connectivity, for example, by means of port mapping tables. In some examples, the control unit 70 interacts with the mobile network OSS (Operation Support System) 75. The OSS 75 provides input to the control unit 70 relating to radio access issues. For example, the OSS 75 is configured to provide information to the control unit 70 relating to interference between adjacent cells, which can be used by the control unit to establish optimal connections between MUs and RRUs. For example, if two RRUs interfere heavily, the OSS 75 can provide information to the control unit 70 about this issue. The control unit is configured to mitigate such an issue, for example, by connecting the interfering RRUs to the same MU in order for common baseband processing and advanced interference mitigation to be possible. In some examples, the OSS 75 is directly connected to the MUs 5, in order to receive information about the status, capacity or other information from the MUs.

In some examples, the switch 10 is configured to avoid CPRI switching on both the RRU and MU sides. This allows a reduction in electrical domain processing for cost and/or Quality of Service (QoS) reasons. In this example, the control unit 70 is configured to control at least one switch of one of the first or second outer stages (CPRI switch 21) to not carry out CPRI (time) multiplexing. In some examples, the first or second outer stage 20,60 adjacent to the source of the transmission (RRU 3 or MU 5) is not carried out. The control unit 70 controls the deferring of the use of CPRI multiplexing on either side of the switch 10. This provides for increased transmission of wavelengths from the source (RRU 3 or MU 5) to the central stage.

For example, if the load is low the control unit 70 may optionally skip CPRI multiplexing on the RRU side (e.g. at the first outer stage 20. This will provide transporting of a wavelength for each RRU data flow, for example, "wastefully" transporting individual RRU side data flows. The data flows are then multiplexed by multiplexer 31, and switched by the central stage 40 as described above. In some examples, those flows are multiplexed on the MU side (i.e. receiving side), before forward the aggregated flows to the destination (i.e. MU).

In some aspects, the control unit 70 will contain information from the connectivity network (i.e. CPRI switches at the DU and RRU sites and the cyclic AWG. The control unit 70 has the information of which switch ports are used for a connection between a MU and a RRU, what wavelength and what cyclic AWG ports. The control unit 70 will further contain information from the radio access network (e.g. RRUs and MUs). The information from the radio access network is communicated to the control unit 70 via standard OSS procedures. In some examples, the information relates to, for example, which RRUs overlap in terms of cells/sectors, or which RRUs interfere with one another. The combined knowledge of the connectivity network (i.e. the switch 10, for example comprising CPRI switching and optical parts) and radio access network will enable the control unit 70 to optimize radio access and connectivity.

In some aspects, the switch 10 comprises an electrical domain multiplexing/demultiplexing of signals from RRUs and MUs. The CPRI switches 21,61 perform the electrical domain multiplexing/demultiplexing of signals from/to RRUs and MUs.

The switch 10 connected between RRUs and MUs provides for switching functionalities. The switch provides for better exploitation of the advantages of a centralized approach (e.g. centralizing base band processing in the MUs), for example, reducing further the number of MU sites and/or balancing the traffic load between remote MUs. A connection between the first stage and second stage is an optical connection at least partially at a wavelength arranged to switch to a destination first unit.

The switch 10 is configured to meet the strict latency requirements of the CPRI protocol.

Examples of the present invention provide for switching between RRUs and MUs which meets the strict latency requirements of the CPRI protocol.

Extending CPRI to a higher number of RRUs or MUs which are not co-located is not trivial using the common layer two technologies (e.g. Ethernet), in particular, in view of the latency requirements.

Examples of the invention may comprise one or more features relating to connectivity. In some aspects, any example of the invention comprises any feature from WO2013/119153. For example, the switch 10 is configured to use a default MU (or MU cluster) to connect all new RRUs initially, to put those RRUs into operation. This may provide for bootstrapping connectivity. Following that, the OSS 75 can inform the Control Unit 70 of radio access conditions, so that the Control Unit 70 can reconnect the RRU to a more appropriate MU or MU cluster. In some aspects, the switch comprises a default node (intermediate node, MU or RRU) which may function as a virtual master and slave. The default node functions as a default node prior to connection of the intended MU and RRU.

In this example, a RRU is directed to a virtual entity connecting the RRU and MU. The virtual entity or entities are part of what could be denoted the control plane, also referred to as CPRI CP, in the architecture. For example, each main unit when connecting to the system connects to a virtual slave entity. As stated above, the virtual slave entity or entities are part of the CP. The data plane is used for distributing user data within the system. A network node then collects or retrieves the control data. This control data is stored at a database (DB), located externally or locally at the control unit 70. The network node may then, based on the retrieved control data, determine a physical path for connecting the different first units to the second units.

Thus, the first and/or second units communicate with their virtual counterparts, i.e. Virtual Slave/Virtual Master respectively. This may involve standard CPRI rate negotiations as well as control & management message exchanges. The first or second units do not need to be aware that the other end is virtual. Once the CPRI entities, i.e., the virtual entities, in the CP has examined the units connected to the system, the virtual entities or network node may disconnect from those units, since now the default node is aware of the first and second units connected to it.

This initiation using a default node, as in WO2013/119153, may or may not be used with the switch arrangement provided by examples of the invention described. An alternative initiation is based on the control unit 70 setting up a connection between the intended MU and RRU, without a default node.

Aspects of the invention improve or enable multi-operator situations, i.e. where RRUs and MUs belong to different operators. In some examples, the control unit 70 is configured to ensure that a particular operator's RRUs are connected to the same operator's MUs.

Figure 3:
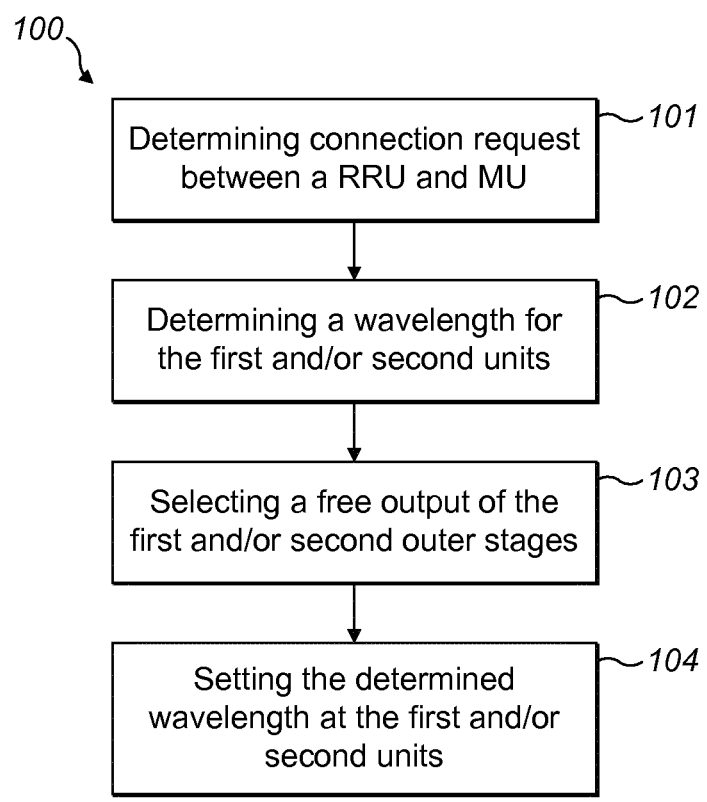
FIG. 3 is a schematic flowchart depicting a method according to an example of the invention.

FIG. 3 illustrates an example of a switching operation 100 as controlled by the control unit 70. The control unit 70 determines in 101 a connection request between a RRU and MU. For example, the control unit 70 determines the connection request between a RRU and MU. The control unit decides the connection between DU and a RRU, e.g. based on trigger events coming from the radio management system and/or traffic load monitoring.

In 102, the control unit 70 determines a wavelength corresponding to the selected cluster of RRUs and MU. The wavelength is for output from the transmitting first and/or second units 18,19. The wavelength is selected such that the central stage transfers the spectral component, based on the wavelength and input port, to the intended destination first or second unit. For example, the wavelength is the wavelength which will be set for the tunable lasers. In some examples, this determination is based at least partially on input from the OSS 75. The determined wavelength is an available wavelength, i.e. not already in use for another connection. For bi-directional traffic, a wavelength is selected for each direction, i.e. to the RRU and to the MU. Thus, the control unit 70 determines one of the wavelengths that are available, i.e. not used, at the AWG ports the corresponding clusters are connected to.

In 103, the control unit 70 selects one of the free outputs in a time or packet domain of the CPRI switch 21,51 within the cluster. The selected output is towards the central stage. This step is optional or not present if the CPRI switch is not present. In that case, the output is merely the output from the selected RRU or MU.

In 104, the control unit 70 sets the corresponding tunable output of the first or second inner stage (e.g. tunable laser) to the selected wavelength. In such a way, the connection is established.

Aspects of the invention provide an architecture which introduces features that are not supported by conventional CPRI networks based on point-to-point connections. For example, if one of the MU clusters is under-loaded, all the connected RRUs can be routed to other MU clusters. This allows the previously under-loaded MU cluster to be completely turned down, significantly reducing the network power consumption.

In a further example, if all the MUs in a cluster are fully loaded, it is anyway possible to switch on or install a new RRU, using remote MUs. This may contribute to enabling heterogeneous ultra-dense networks based on a small cells.

If a MU cluster experiences a fault, all the RRUs can be reconnected to other MU clusters. This allows a reduced overprovisioning compared to backup MU clusters for protection purposes in the traditional point-to-point schemes.

A same RRU can be connected to different MUs in different clusters, for improving the coordination between cells. For example, this may be achieved using different optical wavelengths output from the first or second inner stage to the central stage, e.g. using different tunable lasers. This may be of particular use for small cells, where efficient exploitation of the radio spectrum is important.

The relationship between CPRI data flow capacities and how they are mapped onto wavelengths, can be very dynamic. This may enable schemes that make optimal use of the right combination of electrical and optical switching, whilst catering for radio access needs.

In some aspects, examples of the invention relate to a switch configured to connect a plurality of RRUs with a plurality of MUs in a radio access network. The switch 10 comprises a first outer layer 20 and second outer layer 60 configured to do time switching or packet switching of signals between the RRU and MU. The first outer layer 20 and second outer layer 60 each comprise a plurality of units. The switch 10 further comprises an inner layer 40, connected between the first and second outer layers. The inner layer 40 is configured to carry out lambda switching of wavelengths carrying the optical signals between the first and second outer layers. In some examples, the first outer layer 20 and second outer layer 60 are configured to output an optical signal towards the inner layer 40 having a wavelength selected such that the inner layer 40 (e.g. AWG) switches the optical signal to the intended unit of the other one of the first outer layer 20 and second outer layer 60. In some examples the wavelength of the output optical signal towards the inner layer 40 is determined at an output of the first outer layer 20 or second outer layer 60, e.g. by a tunable laser connected to the output of the first outer layer 20 or second outer layer 60.

Figure 4:
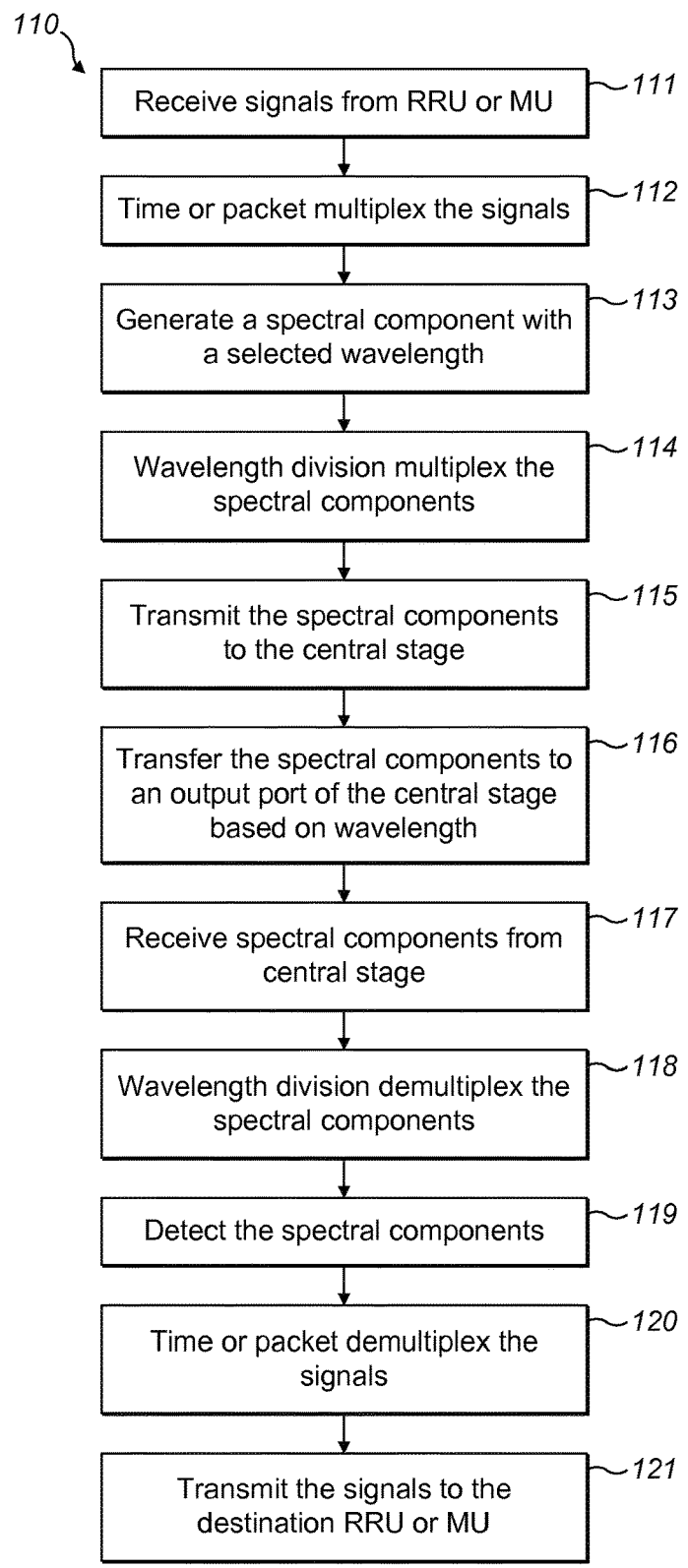
FIG. 4 is a schematic flowchart depicting a method according to a further example of the invention.

FIG. 4 illustrates an example method 110 of operation of the switch 10. The one or more first unit and second unit receive signals 111 (i.e. CPRI signals) from a RRU and MU respectively. The first unit and second unit optionally time or packet multiplex signals 112 from the remote radio units or main units. The first and second units generate a spectral component 113 with a selected wavelength, e.g. using a tunable laser for each spectral component. Then, first unit and second unit are configured to wavelength division multiplex 114 selected wavelengths. Then, the first unit and second unit are configured to transmit 115 the selected wavelengths to the central stage. The central stage passively transfers 116 the spectral component to an output port based on its wavelength. On the opposite side of the central stage 40, the other one of one or more first unit and second unit 18,19 receive 117 the wavelengths output from the central stage, and then wavelength division demultiplex the wavelengths 118. Then, the first and second stages detect the optical signals 119, optionally time or packet demultiplex 120 the signals, and then transmit the signals to the destination remote radio units or main units.

In some examples, the first stages are located adjacent to the RRUs to which they are connected and the second stages are located adjacent to the MUs to which they are connected. In some examples, the first and second stages are located adjacent a cluster of a plurality of RRUs and MUs respectively. The adjacent location of the first and second stages may be a co-location (i.e. same site) as one or more RRUs or MUs, or may be a relatively short distance from one or more RRUs or MUs.

In some examples, the central stage is remote from the first stage and/or the second stage. Communication between the central stage and the first stage and/or the second stage is via optical connection, e.g. optical fiber. The optical connection carries a signal which is wavelength division multiplexed, and optionally, also time or packet division multiplexed.

Aspects of the invention relate to a switching network architecture for CPRI data flows generated in geographically distant clusters of RRUs and MUs. The switching network architecture is able to balance traffic and energy load among the clusters. The switching network architecture is in the form of a distributed switch.

Figure 5:
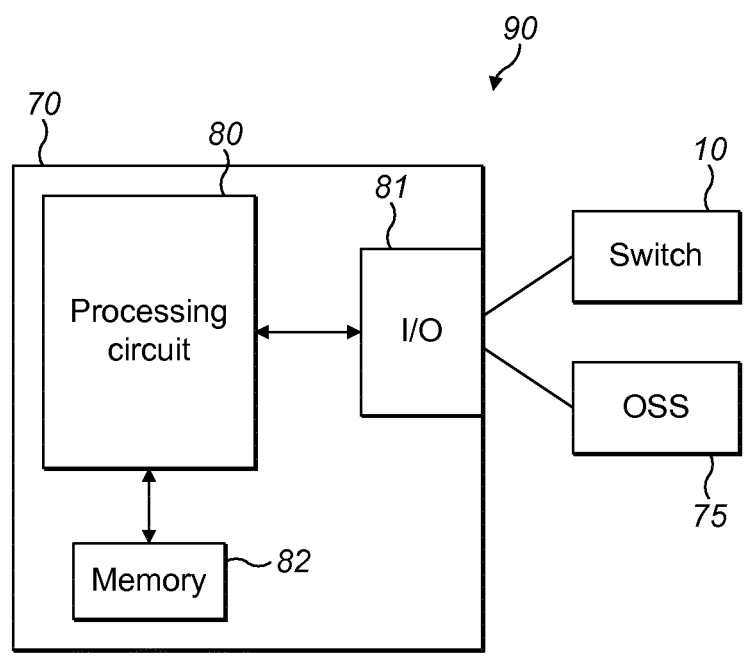
FIG. 5 is a block diagram depicting apparatus according to an example of the invention.

The embodiments herein for enabling a first unit 17 to connect or to be connected ad-hoc to a second unit 18 in a system configured for remote radio units and main units may be implemented through one or more processors, such as a FIG. 5 shows an example implementation of the control unit 70 within a system 90. The system 90 comprises the switch 10, control unit 70 and optionally the OSS 75. In some aspects, the system 90 optionally further comprises the MUs 5 and/or RRUs 3. The control unit 70 comprises a processing circuit 80, together with computer program code for performing the functions and/or method steps of the embodiments herein. An input/output unit 81 is connected to the processing unit in order to transmit commands to the first and second units 18,19. The input/output unit 81 may also receive information from the OSS 75 and/or the first and second units 18,19. A memory 82 is also connected to the processing circuit 80, for operation of the processing circuit 80 and/or storing the current configuration of the switch 10 and any other parameters or data needed.

The program code mentioned above may also be provided as a computer program product, for instance in the form of a data carrier carrying computer program code for performing embodiments herein when being loaded into the control unit 70. One such carrier may be in the form of a CD ROM disc. It is however feasible with other data carriers such as a memory stick. The computer program code may furthermore be provided as pure program code on a server and downloaded to the control unit 70.

In some examples, the first and second units 18,19 comprise a processing circuit and an input and output unit configured to receive commands from the control unit and carry out the functions described above.

Those skilled in the art will also appreciate that various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some aspects, the switch 10 is not configured to carry out time or packet domain switching. In this example, the first and second units 18,19 comprise the first and second inner stages 30,50, but not the first and second outer stages 20,60. The RRUs are connected directly to the first inner stage 30, and the MUs are connected directly the second inner stage 55. Thus, the time or packet multiplexing and demultiplexing is not carried out. Each RRU or MU is allocated a particular wavelength to switch to the intended other of the RRU or MU. This is done without aggregation of signals from different RRU or MU on the same wavelength.

The invention claimed is:

1. A switch configured to connect a plurality of remote radio units with a plurality of main units in a radio access network, the switch comprising:

a first stage comprising one or more first units configured to receive a signal originating from a remote radio unit, and configured to output one or more spectral components having one or more optical wavelengths, wherein the one or more first units are configured to optionally time or packet multiplex signals from the remote radio units, wavelength division multiplex selected wavelengths and transmit the selected wavelengths to a central stage;

the central stage configured to receive the one or more optical wavelengths, and transfer the one or more spectral components to an output port determined by the one or more optical wavelengths; and a second stage comprising one or more second units configured to receive the one or more spectral components from the central stage and output a signal towards a main unit, wherein the one or more second units are further configured to receive the one or more optical wavelengths from the central stage, wavelength division demultiplex the one or more optical wavelengths, and optionally time or packet demultiplex signals and then transmit the signals to the main unit, wherein the one or more first units are configured to control the one or more optical wavelengths of the one or more spectral components such that the one or more spectral components are transferred by the central stage to a selected one of said second units.

2. The switch as claimed in claim 1, wherein the one or more first units further comprises a time or packet domain switch configured to multiplex signals from the remote radio units and the one or more second units comprises a time or packet domain switch configured to demultiplex signals to the main unit.

3. The switch as claimed in claim 1, wherein the one or more first units and the one or more second units comprise a multiplexer and demultiplexer configured to wavelength division multiplex or demultiplex optical signals to and from the central stage respectively.

4. The switch as claimed in claim 1, wherein the central optical stage comprises one or more passive optical devices, and optionally, comprises one or more arrayed waveguide gratings, AWG.

5. The switch as claimed in claim 1, wherein at least one of the first unit or second unit is connected to a plurality of remote radio units or main units.

6. The switch as claimed in claim 1, comprising the one or more first units and the one or more second units, wherein each of the first and second units is connected to a common central stage.

7. The switch as claimed in claim 1, wherein the signals to and from the remote radio units and main unit are Common Public Radio Interface (CPRI) signals.

8. The switch as claimed in claim 1, wherein the one or more second units are configured to receive a signal originating from said main unit, and configured to output one or more spectral components having the one or more optical wavelengths, wherein the central stage is configured to receive the one or more optical, and transfer the one or more spectral components to the output port determined by the one or more optical wavelengths, wherein the first stage comprises one or more first units configured to receive the one or more spectral components and output a signal towards a said remote radio unit, and wherein the one or more second units are configured to control the one or more optical wavelengths of the one or more spectral components such that the one or more spectral components is transferred by the central stage to a selected one of said first units.

9. A switch system comprising: the switch as claimed in claim 1, and a control unit configured to control the switch to connect the determined remote radio unit with the determined main unit.

10. The switch system as claimed in claim 9, further comprising an Operation Support System (OSS) configured to provide an input to the control unit for determining a connection between the remote radio unit and the main unit.

11. A method of operating a switch connecting a plurality of remote radio units with a plurality of main units in a radio access network, the method comprising:
receiving at a first stage a signal originating from a remote radio unit, and outputting one or more spectral components having one or more optical wavelengths, wherein the first stage comprises one or more first units configured to optionally time or packet multiplex signals from the remote radio units, wavelength division multiplex selected wavelengths and transmit the selected wavelengths to a central stage;
receiving at the central stage the one or more optical wavelengths, and transferring the one or more spectral components to an output port determined by the one or more optical wavelengths; and
receiving at a second stage the one or more spectral components and outputting a signal towards a main unit,
wherein the one or more optical wavelengths of the one or more spectral components output from the first stage is controlled such that the one or more spectral components are transferred by the central stage to a second unit that is selected from one or more second units, wherein the one or more second units are further configured to receive the one or more optical wavelengths from the central stage, wavelength division demultiplex the one or more optical wavelengths, and optionally time or packet demultiplex signals and then transmit the signals to the main unit.

12. The method as claimed in claim 11 wherein the method further comprises a first unit time or packet domain switching to multiplex signals from the remote radio units and the one or more second units comprises a time or packet domain switch configured to demultiplex signals towards the main unit.

13. The method as claimed in claim 11 wherein the one or more first units and the one or more second units wavelength division multiplex or demultiplex optical signals to and from the central stage respectively.

14. A non transitory computer readable storage medium comprising instructions that, when performed by a processor, cause the processor to implement a method of operating a switch connecting a plurality of remote radio units with a plurality of main units in a radio access network, the method comprising:
receiving at a first stage a signal originating from a remote radio unit, and outputting one or more spectral components having one or more optical wavelengths, wherein the one or more first units are configured to optionally time or packet multiplex signals from the remote radio units, wavelength division multiplex selected wavelengths and transmit the selected wavelengths to a central stage;
receiving at the central stage the one or more optical wavelengths, and transferring the one or more spectral components to an output port determined by the one or more optical wavelengths; and
receiving at a second stage the one or more spectral components and outputting a signal towards a main unit,
wherein the one or more optical wavelengths of the one or more spectral components output from the first stage is controlled such that the one or more spectral components are transferred by the central stage to a second unit that is selected from one or more second units, wherein the one or more second units are further configured to receive the one or more optical wavelengths from the central stage, wavelength division demultiplex the one or more optical wavelengths, and optionally time or packet demultiplex signals and then transmit the signals to the main unit.

* * * * *